March 23, 1954
E. SCHREIBER ET AL
2,672,787
PHOTOGRAPHIC COPYING APPARATUS
Filed Dec. 20, 1950
2 Sheets-Sheet 1
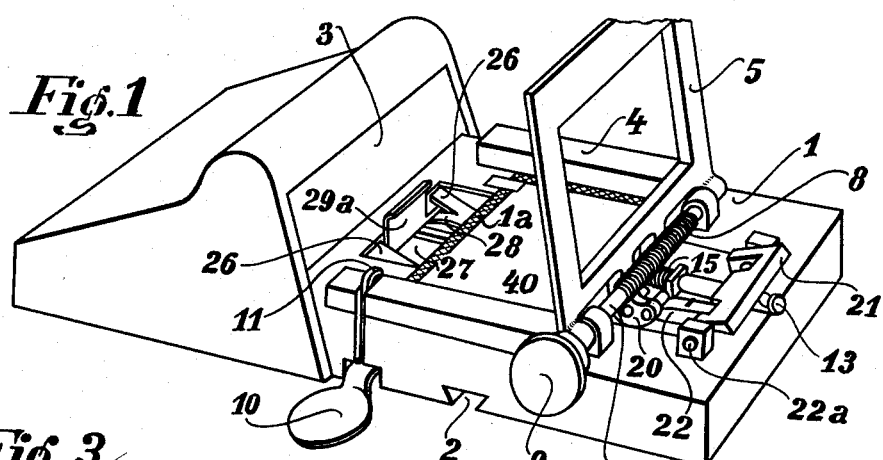
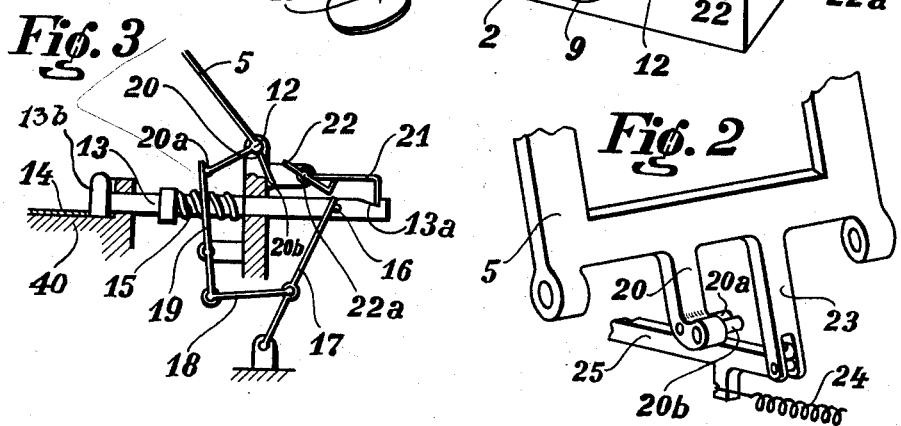
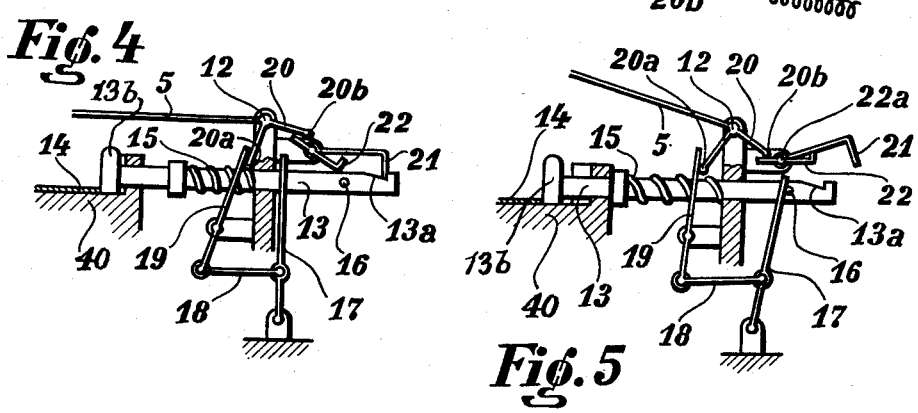
Eduard Schreiber
Gerhart Hennek  INVENTORS
Christian Lutz
BY
Ivan E. A. Königsberg
att.

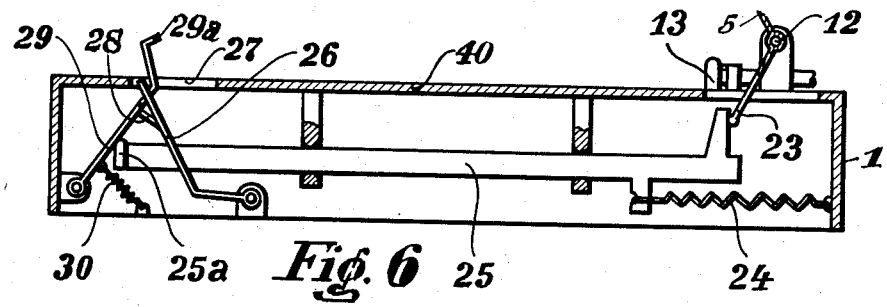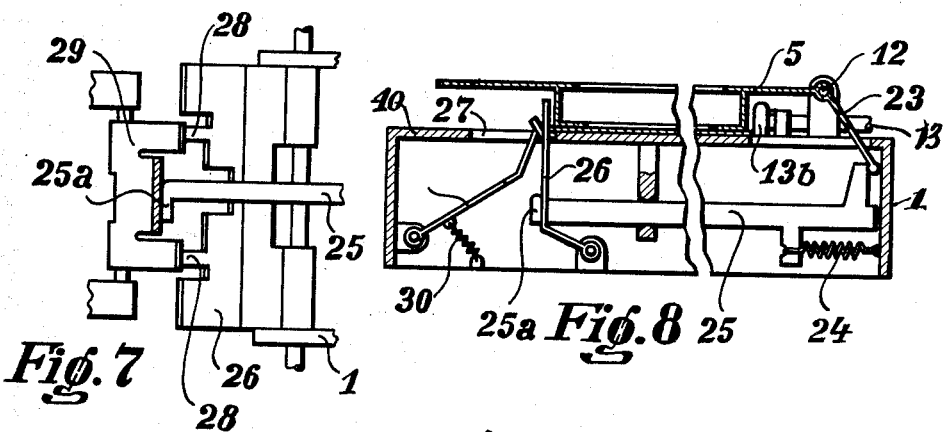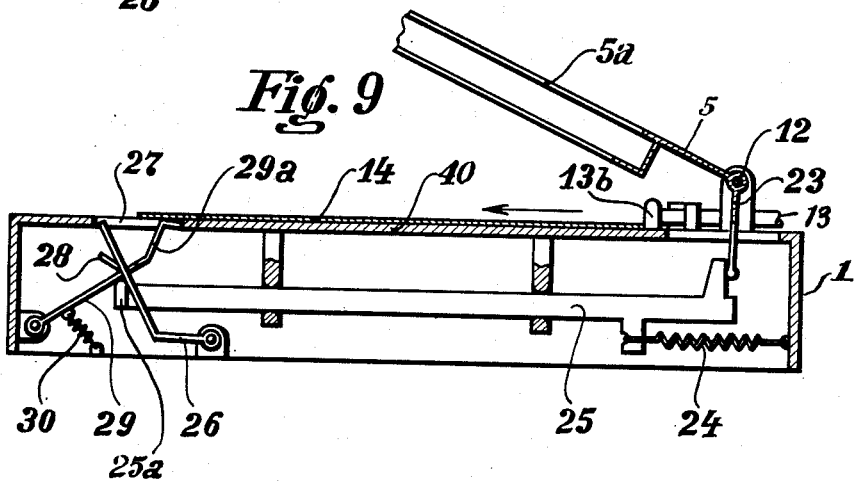

Patented Mar. 23, 1954

2,672,787

UNITED STATES PATENT OFFICE 2,672,787

PHOTOGRAPHIC COPYING APPARATUS

Eduard Schreiber, Gerhart Hennek, and Christian Lüz, Wetzlar (Lahn), Germany, assignors to Ernst Leitz, G. m. b. H., Wetzlar, Germany, a corporation of Germany Application December 20, 1950, Serial No. 201,715

Claims priority, application Germany June 14, 1950

6 Claims. (Cl. 88—24)

1

This invention relates to improvements in photographic copying apparatus adapted for use in connection with photographic enlargers for the purpose of providing improved means for mass production of enlargement copies upon sheets of sensitized photo paper from an original. The invention includes an ejector mechanism and a paper feeding and registering mechanism for quickly and automatically feeding a sheet of sensitized photo paper into exposure position and for quickly and automatically ejecting the sheet after exposure.

The art of photography includes photographic enlargers whereby enlargements, from a smaller original carried by the enlarger, may be made upon sensitized photo paper placed beneath the enlarger and whereby the photo paper is exposed and receives the enlarged copy from the original in the enlarger. One sheet after another may be placed by hand and exposed, but such manual operation is not suitable for mass production which requires that the exposure of one sheet after another be made automatically and very rapidly.

It is an object of the invention to provide an apparatus for the automatic handling of the photo paper whereby the apparatus becomes particularly well adapted for mass production. It is a further object to provide such an apparatus in the form of a self contained accessory which may be used with any photographic enlarger having a table or bench for the support of the apparatus itself. Another object is to provide a box like apparatus having a cover in the form of a rectangular masking frame and with paper handling means automatically operable by the opening and closing of the cover. In the accompanying drawings—

Fig. 1 is a perspective view of a photographic copying apparatus embodying the invention with the cover in open position.

Fig. 2 is a perspective view of a detail of the cover.

Fig. 3 is a schematic illustration of the paper ejecting mechanism with the cover in open position.

Fig. 4 is a similar view with the cover closed.

Fig. 5 illustrates the paper ejecting mechanism in released position ready to eject a sheet of paper as the cover is opened.

Fig. 6 is a schematic illustration showing the paper feeding and registering mechanism in position when the cover is opened.

Fig. 7 is a plan detail view of parts of the feeding mechanism.

2

Fig. 8 shows the paper feeding and registering mechanism in position after the cover has been closed, parts being broken away.

Fig. 9 shows the paper feeding mechanism in the position when the paper is ready to be ejected when the cover is opened.

The copying apparatus 1 may have a dovetailed slot 2 in the bottom for ready attachment to a table or bench beneath a photographic enlarger, not shown. At the rear of the apparatus there is a collecting receptacle or box 3 into which the sheets of photo paper copies are ejected and from which they are collected for further processing. The apparatus 1 is formed like a flat box with upstanding sides 4 which guide the sheet of paper as it is thrown upon a platen 40. The latter may have framing markings 1a whereby the box may be shifted beneath the enlarger so that a predetermined sized copy may be made. Such copy may be only part of the image on the original and the markings 1a serve to frame the wanted copy on the sheet of paper.

After the paper 14 has been fed into the box 1 it is held flat in exposure position by a cover 5 which forms a masking frame. The cover is pivoted to the box by a shaft 12. The cover is closed by hand and is then automatically engaged and held by a locking clamp 11. After exposure the operator operates a hand lever 10 to release the clamp 11 and the cover then swings open under pressure of a spring 8 which may be adjusted by a hand knob 9. As seen in Fig. 9, the cover 5 is in the form of a rectangular frame having an exposure opening 5a.

Figs. 6, 7, 8 and 9 illustrate the paper feeding mechanism. When copying is to be done, the cover 5 is opened and the operator throws a sheet of photo paper 14 upon the platen 40 so that the paper comes between the guides 4 and then closes the cover. The shaft 12 carries an arm 23 which engages a slidably supported feeder bar 25 which includes a hook 25a and is retractable by a spring 24. At the rear of the box 1 two arms are pivoted. One arm 29 has an upstanding portion 29a which, when the sheet is thrown into the box, forms a rear side and prevents the sheet from backing out, see Fig. 1. A spring 30 tends to pull the arm 29 within the box. The arm 29 may be called a pusher arm. The other arm 26 is a paper feeding arm which tends to disappear within the box by gravity as shown in Figs. 6 and 9. The feeder arm 26 has lugs 28 which engage the pusher arm 29 as shown to raise the latter into upright position as in Figs. 1 and 6. Both arms serve to feed the sheet of sensitized paper into exposure position and both arms have their upper free ends movable within an opening 27 in the platen 40.

The operation of the paper feeding and registering means is as follows: When the box is open, Fig. 6, the arm 23 has pushed the feeder bar 25 to the rear (left) of the box. The hook 25a has engaged the pusher arm 29 to raise it against the pull of the spring 30 and the feeder arm 26 has fallen by gravity within the box. In this position, therefore, only the portion 29a projects above the platen and forms an edge over which the operator may conveniently slide or throw the sheet of paper into the box.

When the cover is then closed, the arm 23 moves into the position in Fig. 8 and the feeder bar 25 is pulled forwardly (right) by the spring 24. As it moves, its hook 25a engages the feeding arm 26, thereby removing the lugs 28 from engagement with the pusher arm 29 so that the latter can be pulled forward by its spring 30. As now the feeder bar 25 completes its forward (right) movement it carries the feeder arm along to finally kick the sheet of paper into exposure position between the guides 4 and against a stop 13b which also acts as an ejector to be explained hereafter. After exposure the cover is opened and as seen in Fig. 9 both the feeder arm 26 and the pusher arm 29 disappear beneath the surface of the platen 40. The arm 26 sinks down by gravity. The arm 29 is pulled down by its spring 30, and the sheet is ejected from the box by the following ejecting mechanism, Figs. 2–5.

The cover shaft 12 carries two fingers 20a and 20b. The finger 20a engages an upstanding lever 19 which is connected by a link 18 with another upstanding lever 17. The upper end of lever 17 engages a pin 16 on a slidably supported ejector bar 13. At its rear (right) end the bar has a hook 13a. At the other forward end (left) the bar has a stop 13b which serves to eject the sheet and which may be in the form of a transverse edge or ruler across the box, not shown in detail. The arm 20b engages a release 22 which is actuated to lift a gravity actuated lock lever 21 out of the hook 13a to release the ejector bar to eject the sheet by the force of the spring 15.

The operation of the ejector mechanism is as follows. When the box is open, Fig. 3, the finger 20a engages the lever 19 which in turn actuates the lever 17 to push the ejector bar 13 forwardly against the pull of the spring 15 by engaging the pin 16 and the gravity actuated lock lever 21 drops down into the hook 13a to lock the ejector bar 13 in retracted position, as shown. At this time the finger 20b is inactive. The stop 13b is retracted and in position to stop and register the forward edge of the sheet of paper 14. When then the cover 5 is closed, the finger 20a moves away from the lever 19 so that the latter and the lever 17 are now in the position as shown in Fig. 4. The lever 17 no longer engages the pin 16, but the ejector bar 13 is still locked in retracted position by the lock lever 21. However, during the first part of the cover closing movement, the finger 20b has been lifted and by-passed the release 22. When now the cover is opened, Fig. 5, finger 20b descends upon the release 22 which is lifted to lift the lock lever 21 out of the hook 13a. The spring 15 then propels the ejector bar 13 rearwards to eject the paper.

The cycle of operations is as follows. With the cover open, the feeder means 25, 26, 29 are held by the cover finger 23 ready to feed a sheet of paper into the box. The ejector bar 13 is locked.

The operator throws a sheet of paper into the box and closes the cover. The closing operation moves the cover finger 23 into the position shown in Fig. 8 and the spring 24 then operates the feeding means 24, 26, 29 to feed the paper into exposure position, Fig. 8. After exposure the operator depresses the handle 10. The cover flies open by spring pressure 8. As it opens the feeder means are caused to disappear within the box and the ejector means are actuated to eject the paper, Fig. 9.

From the foregoing description it will be seen that the operator only touches the lever 10 to release the cover. Then a sheet is automatically ejected. Then the operator throws in the next sheet and closes the cover. The apparatus automatically feeds the sheet into exposure position and automatically ejects the exposed sheet. The apparatus is therefore adapted for mass production of copies.

The invention is not limited to the precise details shown and described. We claim all such changes and modifications as come within the principle of the invention and the scope of the appended claims. It will be understood that the copies hereinabove referred to are photo prints or photostat copies from the original which is held in the enlarger.

We claim:

1. An apparatus for holding photopaper for photographic enlarging and copying purposes comprising a base, a platen thereon, a frame cover hinged to said platen and manually closeable thereupon, means for holding the cover closed on the platen, manual means for releasing said holding means; a spring connected to said cover and platen for opening the cover when said holding means are released; a mechanism for feeding sheets of photopaper to the platen for exposure thereon comprising paper feeding means movably supported on said base and platen in operative relation to the platen in a normal starting position when said cover is open; springs operatively connected to said paper feeding means to move the same to engage and feed a sheet of paper, placed upon the platen, into exposure position thereon when said cover is closed upon the platen and means on the cover movable therewith and operatively engaging said paper feeding means to move the same back into said starting position when the cover is opened after exposure of said sheet of paper.

2. An apparatus according to claim 1 in which the said paper feeding means comprises a first pivotally supported paper feeding arm having its free end projecting above the platen to prevent accidental removal of a sheet of paper placed upon the platen; a spring connected to said first arm to move the same to engage a sheet of paper, placed upon the platen and impart an initial feeding movement to the sheet of paper; a second pivotally supported paper feeding arm operated by gravity into a starting position and engaging said first arm to hold it retracted in said starting position; a feeder bar operatively engaging said second arm to move the same; a spring connected to said bar to move the latter and said second arm to feed a sheet of paper, placed upon the platen, into exposure position thereon when said cover is closed and a finger connected to and movable with the cover into operative engagement with said feeder bar to move the latter out of engagement with said second feeder arm when the cover is opened, said second feeder arm falling by gravity into its said starting position engaging said first arm to retract the same as aforesaid.

3. An apparatus according to claim 1 including a mechanism for ejecting exposed photopaper from the platen comprising a paper ejector slidably supported on the platen; gravity actuated means holding said ejector retracted while said cover is closed; means on the cover operatively engaging said ejector holding means to actuate the same to release the ejector as the said cover is opened; a spring on the ejector to move the same to eject exposed paper from the platen as the cover is opened; ejector retracting means operatively engaging the ejector and means on the cover operatively engaging said ejector retracting means to operate the same to retract the ejector as the cover is closed.

4. In an apparatus according to claim 3 in which a slidably supported paper ejector, a spring normally urging the ejector to eject the sheet of paper, a gravity actuated lock lever for locking said ejector against paper ejecting operation during exposure of the sheet of paper against the force of said spring, a lift lever to release said lock lever from locking engagement with the said ejector after exposure of the sheet of photo paper and a finger on said masking frame for operating the said lift lever.

5. An ejector mechanism according to claim 4 including means to retract the said ejector after ejection of the sheet of photo paper and a second finger on said frame cover for actuating the said retracting means.

6. An apparatus for holding photopaper for photographic enlarging and copying purposes comprising a base, a paper receiving platen thereon, a cover hinged to said platen and manually closeable thereupon, means for holding the cover closed on the platen, manually operated means engaging said cover holding means to release the cover; a spring connected to and between the cover and platen for opening the cover when said holding means are released; a paper feeding mechanism supported on said base and platen for moving a sheet of photopaper, placed on the platen, into exposure position thereon; a mechanism supported in operative relation to the platen for ejecting the exposed sheet of paper therefrom; the said feeding and ejecting mechanisms being operable in response to and dependent upon the movements of the said cover as it is closed upon and opened on the platen; said paper feeding mechanism comprising movable means supported on said base and platen in a normal starting position for engaging and moving the sheet of paper into the exposure position on the platen; a spring connected to said movable feeding means for operating the same to move the sheet of paper as aforesaid as said cover is manually closed upon the platen; means upon and movable with the said cover operatively engaging said movable paper feeding means to move the same against the force of the said spring back into said starting position of the paper feeding means as said cover is opened; said paper ejecting mechanism comprising a paper ejector slidably supported upon the platen for ejecting exposed photopaper therefrom; locking means operatively engaging said ejector to lock the same in a retracted position while said cover is closed; means on the cover movable therewith operatively engaging said locking means to actuate the same to release the ejector when the cover is opened; a spring on the ejector for moving the same to eject the paper as the cover is opened; means for retracting the ejector and means on the cover movable therewith operatively engaging said ejector retracting means to retract the ejector as the cover is closed.

EDUARD SCHREIBER.
GERHART HENNEK.
CHRISTIAN LÜZ.

References Cited in the file of this patent
UNITED STATES PATENTS

| Number | Name | Date |
|---|---|---|
| 1,894,005 | Rose | Jan. 10, 1933 |
| 2,132,998 | Schulz | Oct. 11, 1938 |